Dec. 8, 1970 D. H. COVILL 3,546,590

WIDE BAND RADIO TRANSMITTER

Filed June 14, 1965 2 Sheets-Sheet 1

Dec. 8, 1970 D. H. COVILL 3,546,590

WIDE BAND RADIO TRANSMITTER

Filed June 14, 1965 2 Sheets-Sheet 2

United States Patent Office 3,546,590
Patented Dec. 8, 1970

3,546,590

WIDE BAND RADIO TRANSMITTER

Dennis H. Covill, Hacketts Cove, Halifax County, Nova Scotia, Canada, assignor to E.M.I.-Cossor Electronics Limited, Dartmouth, Nova Scotia, Canada, a company of Canada Filed June 14, 1965, Ser. No. 463,659
Claims priority, application Great Britain, June 13, 1964, 24,634/64
Int. Cl. H04b 1/04
U.S. Cl. 325—171 2 Claims

ABSTRACT OF THE DISCLOSURE

A wide band radio transmitter especially adapted for handling teletype traffic comprises a radio frequency generator tunable to a plurality of different frequency channels. The generator is coupled to the final amplifier by way of a driver amplifier and respective coupling circuits. The driver amplifier, the final amplifier and the circuits coupling them to the radio frequency generator and to one another are substantially linear over a frequency band including the different channels to which the generator can be tuned. However the final amplifier is coupled to the antenna by coupling means which comprises a plurality of band pass filters each having a semi-octave pass band including different frequency channels, and the band pass filters can be switched selectively to couple the final amplifier to the antenna.

Figure 1:
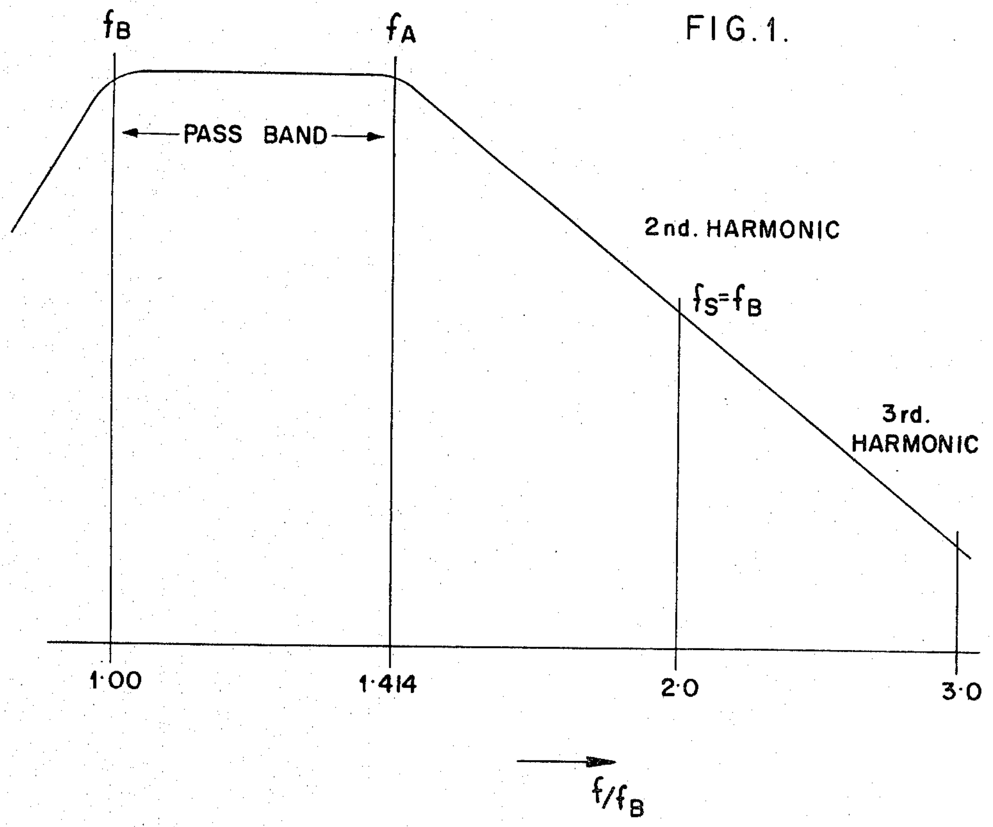

This invention relates to wide band radio transmitters especially for use at high frequencies.

In communication systems employing high frequency transmitters, for example for teletype traffic, changing the operating frequency of the transmitter is sometimes required. However the tuning of high frequency transmitters is associated with some difficulty. Hand tuning is a skilled and time consuming operation and automatic tuning by means of servo systems requires cumbersome and relatively expensive equipment. It has therefore been proposed to construct wide band transmitters with no tuning requirements. Such a transmitter may embody a distributed amplifier to provide wide band amplification over the entire high frequency band. However such wide band operation can only be achieved at a cost of reduction in efficiency. For example a distributed amplifier delivers only half the developed power to the antenna, the other half being dissipated in a dummy termination and the amplifier itself has to operate under very linear and therefore inefficient conditions to ensure that a low level of harmonic energy is generated. With no tuning in the amplifier very pure signals are required from the synthesiser and these signals must not be appreciably distorted in the amplification process.

The object of the present invention is to provide a radio transmitter which is capable of non-critical tuning and yet can provide adequate harmonic and other unwanted signal attenuation.

According to the present invention there is provided a radio transmitter comprising a radio frequency generator tunable to a plurality of different frequency channels, a driver amplifier coupled to said generator, a final amplifier coupled to said driver amplifier, an antenna, and output coupling means for coupling said final amplifier to said antenna, wherein the improvement is that said driver amplifier, said final amplifier and the circuits coupling them to the radio frequency generator and to one another are responsive without tuning over a frequency band including said different channels, and said output coupling means comprises a plurality of band pass filters having different pass bands respectively including different frequency channels, and which can be switched selectively to couple the said final amplifier to said antenna.

Preferably each filter has a semi-octave pass-band, that is a pass-band for which $$f_A/f_B=\sqrt{2}$$

where $f_A$ and $f_B$ are the upper and lower cut off frequencies respectively. Other ratios of $f_A/f_B$ may however be adopted, say in the range form 1.20 to 1.75. Preferably moreover the response is substantially flat inside this pass-band whereas signals outside the band are attenuated in accordance with their proportional distance from the band. A signal anywhere in the pass-band will have its second, third and other harmonics outside the band and the harmonics will therefore be subject to attenuation.

Figure 2:
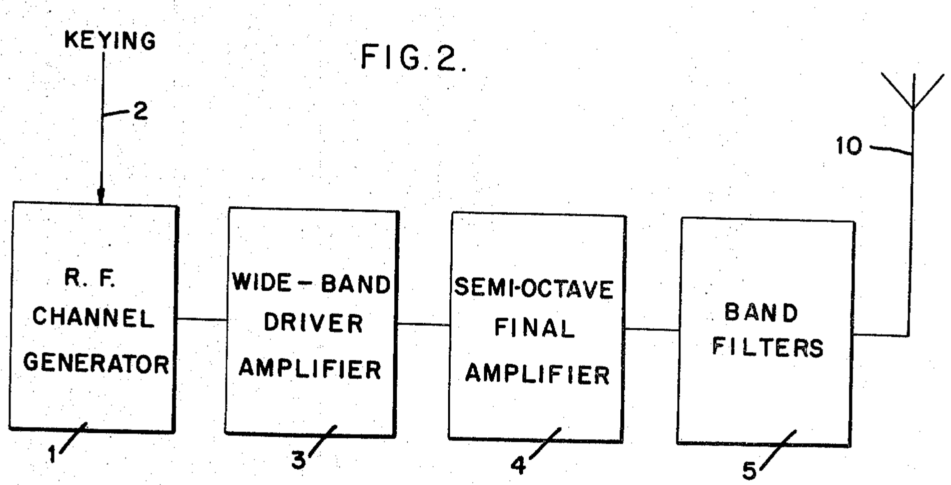
Figure 3:
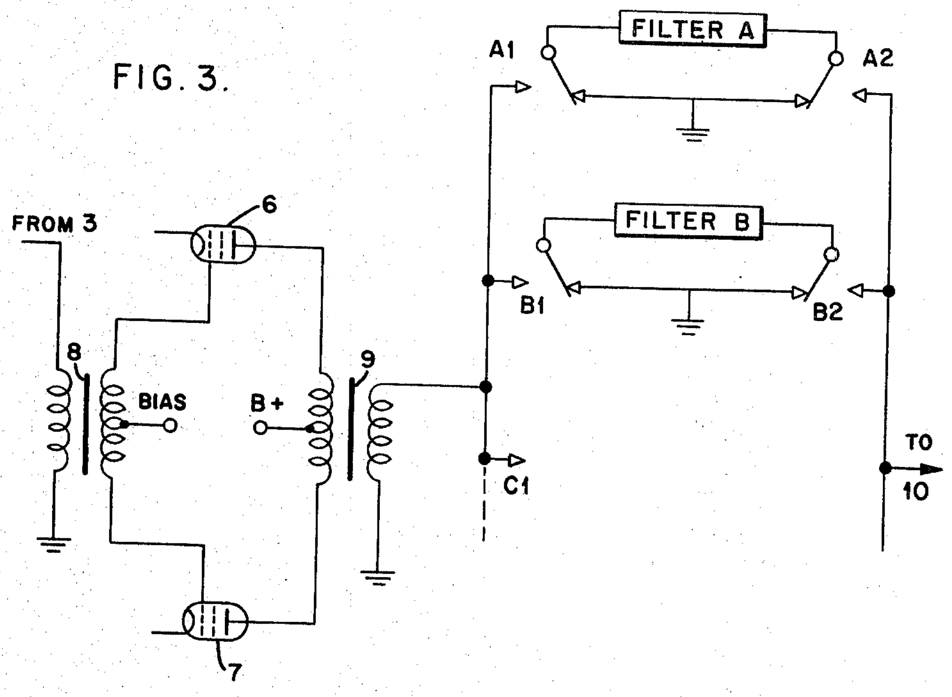

In order that the present invention may be clearly understood and readily carried into effect, the invention will now be more fully described with reference to the accompanying drawings, in which:

FIG. 1 illustrates a representative response curve of a semi-octave band pass filter used in a transmitter in accordance with the invention, FIG. 2 is a block diagram of a transmitter according to one example of the invention, and FIG. 3 illustrates the final amplifier of the transmitter shown in FIG. 2.

The amplifier which is represented in FIG. 3 embodies band pass filters whereby the amplifier may provide rapid non-critical tuning and yet provide harmonic attenuation. The filters are three pole Butterworth filters in this example of the invention, but other suitable filters may be used, such as Tchebycheff or image parameter filters, and moreover the number of poles may differ from three. FIG. 1 shows a response characteristic representative of a Butterworth band pass filter and indicates the upper and lower cut off frequencies $f_A$ and $f_B$. The abscissae of FIG. 1 indicate frequency on a logarithmic scale as the ratio $f/f_B$ whereas the ordinates indicate the response of the filter. The case of least harmonic attenuation will occur, when the signal frequency lies at the lower pass band edge, that is $f/f_B$ is approximately 1, in that the harmonics will then lie closest to the upper edge of the pass band. On the assumption of a 1 db loss at the band edges the second harmonic attenuation is approximately 8 db and the third harmonic attenuation is approximately 30 db. As the amplifier, as will appear with reference to FIG. 3, is a push pull amplifier, odd harmonic distortion predominates and the rejection figures indicated are therefore satisfactory.

In FIG. 2 the transmitter shown comprises an RF channel generator 1 which is coupled, as indicated by the line 2, to a source of keying signals. The keyed radio frequency output of the generator 1 is applied to a wide band driver amplifier 3 which is substantially linear. This is an untuned amplifier having a frequency band from about 2 to 40 mc./s. and is designed to amplify the output of the generator 1 from a power level of about 1 watt up to a power level of approximately 200 watt. Any harmonics which are generated in this wide band driver amplifier are substantially attenuated by the band pass filters in the final amplifier. The final amplifier is represented in FIG. 2 by the two blocks 4 and 5, the block 4 representing the push pull connected amplifying valves and the appropriate wide band transformers while the block 5 represents the switchable band pass filters. The actual construction of this amplifier is shown in greater detail in FIG. 3 from which it can be seen that it comprises two tetrode valves 6 and 7 which have their control electrodes connected to the terminals of the secondary winding of a wide band transformer 8 the primary of which receives the drive from the driver amplifier 3. The anodes of the valves 6 and 7 are in turn connected to the terminals of the primary winding of a transformer 9 the secondary of which has one terminal earthed and the other terminal connected as indicated, to one contact of a series of switches A1, B1, C1 etc. The connections to the other electrodes of the valves 6 and 7 are not represented in the drawing since they are conventional. The H.T. voltage for the anodes of the valves is applied to the centre tap of the primary winding of the transformer 9 and the bias voltage for the control electrodes is applied to the centre tap of the secondary winding of the transformer 8. The band pass filter represented by the block 5 in FIG. 2 comprises a plurality, say 8, of Butterworth band pass filters having semi-octave pass bands. The filters are not shown in detail in FIG. 3 but two of them are represented by the rectangle A and B. The filter A has its input and output terminals connected respectively to the blade of the switch A1 and to the blade of a corresponding switch A2. Similarly the filter B has its input and output terminals connected respectively to the blades of two switches B1 and B2, and so on for the other filters. As aforesaid, the switches A1, B1 . . . have one contact connected to the secondary windings of the transformer 9, and they each have a second contact which is earthed. Similarly the switches A2, B2 . . . have one contact which is earthed and a second contact which is connected to the antenna 10. The switches A1, B1 . . . and A2, B2 . . . are relay operated, and the switches A1 and A2 may be operated by the same relay and similarly the switches B1 and B2 and so on. The switches which are shown in FIG. 2 are in the condition when the corresponding filters are inoperative. If however it is desired to switch the filter A into the signal channel of the amplifier, the condition of the switches A1 and A2 is reversed from that shown in the drawing. In practice the switches are operated so that a selected one of the filters is connected in the signal channel. The control circuit for the relays may consist of a decoding circuit having three input terminals arranged to apply operating current to a selected relay in response to a binary signal applied to the three input terminals.

In a practical form of the circuit being described, the valves 6 and 7 are of type 4CX3000A although other similar valves may be used. The transformer 9 is arranged to match these valves to the feed line impedance. he amplifier 4, 5 has a frequency coverage of about 2.375 mc./s. to about 38 mc./s. This represents a total of four frequency octaves and the filters A, B . . . are arranged to have semi-octave pass bands according to the following table:

| Semi octave: | Frequency range, mc./s. |
|---|---|
| 1 | 2.37–3.36 |
| 2 | 3.36–4.75 |
| 3 | 4.75–6.71 |
| 4 | 6.71–9.50 |
| 5 | 9.50–13.43 |
| 6 | 13.43–19.00 |
| 7 | 19.00–26.86 |
| 8 | 26.86–38.00 |

The RF channel generator 1 of the transmitter can be tuned to 8 channels within each semi-octave and the transmitter is arranged to have a P.E.P. of 5,000 watts under linear amplifier conditions. The time required to change the frequency of the transmitter is no more than the operating time of the appropriate relay, which may be about 5 to 20 milliseconds.

A transmitter such as described with reference to FIGS. 2 and 3 is especially adapted for use in a communication system incorporating interrogating apparatus for determining the optimum carrier frequency for radio communication.

What is claimed is:

1. A radio transmitter comprising:
(a) a radio frequency generator tunable to a plurality of different frequency channels,
(b) a driver amplifier coupled to said generator,
(c) a final amplifier coupled to said driver amplifier,
(d) an antenna,
(e) output coupling means for coupling said final amplifier to said antenna, wherein the improvement is that
(f) said driver amplifier, said final amplifier and the circuits coupling them to the radio frequency generator and to one another are responsive without tuning over a frequency band including said different channels, and
(g) said output coupling means comprises a plurality of band pass filters having different pass bands each pass band being such that the ratio of the upper cut-off frequency is in the range from 1.20 to 1.75, said pass band respectively including different frequency channels, and which can be switched selectively to couple said final amplifier to said antenna.

2. A transmitter according to claim 1 in which each pass band is semi-octave pass-band.

References Cited

UNITED STATES PATENTS

| | | | |
|---|---|---|---|
| 1,872,364 | 8/1932 | Trouant | 325—172 |
| 2,679,005 | 5/1954 | Bataille et al. | 325—171 |
| 2,855,508 | 10/1958 | Barlow et al. | 325—171 |
| 1,686,504 | 10/1928 | Dodge et al. | 330—148X |
| 2,018,401 | 10/1935 | Heising | 325—123 |
| 2,626,323 | 1/1953 | Sziklsi | 330—148X |
| 2,921,292 | 1/1960 | Undy | 325—155X |

RICHARD MURRAY, Primary Examiner

A. J. MAYER, Assistant Examiner

U.S. Cl. X.R.

325—124, 172